United States Patent
Leupert et al.

(10) Patent No.: US 12,157,216 B2
(45) Date of Patent: Dec. 3, 2024

(54) POWER TOOL

(71) Applicant: Robert Bosch GmbH, Stuttgart (DE)

(72) Inventors: Markus Leupert, Murrhardt (DE);
Stefan Horstmann,
Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 18/006,307

(22) PCT Filed: Jul. 7, 2021

(86) PCT No.: PCT/EP2021/068812
§ 371 (c)(1),
(2) Date: Jan. 20, 2023

(87) PCT Pub. No.: WO2022/022960
PCT Pub. Date: Feb. 3, 2022

(65) Prior Publication Data
US 2023/0294264 A1    Sep. 21, 2023

(30) Foreign Application Priority Data

Jul. 27, 2020  (DE) .................... 10 2020 209 440.3

(51) Int. Cl.
*B25F 5/00* (2006.01)
*H02P 3/10* (2006.01)
*B25B 21/00* (2006.01)

(52) U.S. Cl.
CPC ............... *B25F 5/001* (2013.01); *H02P 3/10* (2013.01); *B25B 21/00* (2013.01)

(58) Field of Classification Search
CPC .................................. B25F 5/001; H02P 3/10
See application file for complete search history.

(56) References Cited

U.S. PATENT DOCUMENTS

| 4,273,198 A | 6/1981 | Doniwa |
| 8,466,641 B2* | 6/2013 | Kaufmann ................ H02P 6/24 |
| | | 318/362 |
| 2003/0173919 A1* | 9/2003 | Altendorf ................ H02P 3/24 |
| | | 318/375 |
| 2013/0082631 A1 | 4/2013 | Suzuki et al. |

FOREIGN PATENT DOCUMENTS

| DE | 10 2010 032 335 A1 | 1/2012 |
| WO | 2005/049294 A1 | 6/2005 |

OTHER PUBLICATIONS

International Search Report corresponding to PCT Application No. PCT/EP2021/068812, mailed Oct. 19, 2021 (German and English language document) (6 pages).

* cited by examiner

*Primary Examiner* — Nathaniel C Chukwurah
(74) *Attorney, Agent, or Firm* — Maginot, Moore & Beck LLP

(57) ABSTRACT

A power tool, in particular an electric screwdriver, includes (i) a housing; (ii) an electric motor which is located in the housing and by way of which an insert tool located in a tool holder can be rotationally driven; (iii) and a control device which is designed to control a braking process of the electric motor in response to a braking request in order to stop the rotating insert tool. The braking process includes counter-current braking. A method for braking an electric motor of a power tool, a computer program, and a machine-readable storage medium are also disclosed.

11 Claims, 3 Drawing Sheets

POWER TOOL

This application is a 35 U.S.C. § 371 National Stage Application of PCT/EP2021/068812, filed on Jul. 7, 2021, which claims the benefit of priority to Serial No. DE 10 2020 209 440.3, filed on Jul. 27, 2020 in Germany, the disclosures of which are incorporated herein by reference in their entirety.

The disclosure relates to a power tool, a method for braking an electric motor of a power tool, a computer program, and a machine-readable storage medium.

BACKGROUND

Industrial shut-off clutch screwdrivers are known. Shut-off clutch screwdrivers are used in industry to assemble components, housings, devices, etc., and generally require high repeatability. It is elementary for the accuracy of the screwdrivers that they have a constant rotational speed. An accelerator function, as is known in cordless screwdrivers, is not permitted in shut-off clutch screwdrivers. In order to achieve a constant rotational speed over an entire battery charge, an idle speed of the motor is reduced via electronics (brushless DC motors).

Furthermore, a braking time and/or motor revolution during braking needs to be reduced in order to prevent an overrunning clutch of the power tool from overrunning a second time. Overrunning more than once will worsen the repeatability.

The patent specification EP 1 684 949 B1 discloses a hand-held power tool.

SUMMARY

The object of the invention disclosure is to provide a design for efficient braking of an electric motor of a power tool.

This object is achieved by way of the subject matter described below. Advantageous embodiments of the disclosure are contained in the subject matter described below.

According to a first aspect, a power tool, in particular an electric screwdriver, is provided, comprising:
  a housing,
  an electric motor located in the housing by means of which an insert tool located in a tool holder can be rotationally driven,
  a control device which is designed to control a braking process of the electric motor in response to a braking request in order to stop the rotating insert tool, wherein the braking process comprises countercurrent braking.

According to a second aspect, a method is provided for braking an electric motor of a power tool, in particular an electric screwdriver, by means of which an insert tool located in a tool holder of the power tool can be rotationally driven, wherein, in response to a braking request, a braking process of the electric motor is controlled in order to stop the rotating insert tool, wherein the braking process comprises countercurrent braking.

According to a third aspect, a computer program is provided which comprises instructions which, when the computer program is executed by a computer, for example by the power tool according to the first aspect and/or according to the control device of the power tool according to the first aspect, cause this computer to carry out a method according to the second aspect.

According to a fourth aspect, a machine-readable storage medium is provided on which the computer program according to the third aspect is stored.

The disclosure is based on and incorporates the knowledge that the braking process of the electric motor is controlled such that it includes countercurrent braking. This results in the technical advantage, for example, that the electric motor can be efficiently braked and/or stopped.

Countercurrent braking includes generation of a counterfield on the rotor by the stator of the electric motor. This advantageously leads to an efficient and effective braking of the electric motor. An analogy here, for example, is shifting into reverse gear while a motor vehicle is moving forward, except that here a braking effect is maximized in the process.

This further brings about, for example, the technical advantage that an overrunning clutch of the power tool can be efficiently prevented from overrunning a second time. As a result, for example, a high degree of repeatability of the power tool can be brought about in an advantageous manner.

According to one embodiment, the power tool comprises an overrunning clutch that couples an output of the electric motor to the insert holder.

According to one embodiment, the power tool is an electric screwdriver. According to one embodiment, the electric screwdriver is a shut-off clutch screwdriver. According to one embodiment, the power tool is an industrial power tool. According to one embodiment, the shut-off clutch screwdriver is an industrial shut-off clutch screwdriver.

According to one embodiment, the insert tool is an element selected from the following group of insert tools: screwdriver, thread cutter, self-tapping screw.

According to one embodiment, the power tool comprises an electrical energy storage device, in particular a lithium-ion accumulator, which can be electrically connected to the electric motor in order to supply the electric motor with electrical energy, wherein a parasitic electrical current generated by the countercurrent braking can be discharged into the electrical energy storage device in order to charge the electrical energy storage device with the parasitic electrical current.

This results in the technical advantage, for example, that the parasitic electrical current generated due to the countercurrent braking can be efficiently dissipated. In particular, this results in the technical advantage that the electrical energy storage device can be charged efficiently.

When countercurrent braking takes place, parasitic return currents can arise, for example in the case of a commutation, which must be dissipated since, for example, an intermediate circuit can otherwise be damaged. In the known prior art, it is customary to dissipate such a parasitic electrical current in a clocked manner into heat with a resistor ("brake chopper") (requires high resistance and cooling) or to greatly increase an intermediate circuit (large capacitors). These two disadvantages/problems, of heat dissipation and corresponding installation space increase, are advantageously eliminated by the parasitic electrical current being dissipated in the electrical energy storage device.

In particular, a compact, lightweight, cool, and low-noise power tool is thereby provided. Furthermore, this will advantageously lead to an increase in the service life of the power tool. Furthermore, due to the correspondingly lower material use, the power tool becomes more robust (higher quality) and more favorable for a customer, and more favorable for a manufacturer in terms of production.

In one embodiment, the electrical energy storage device is a lithium-ion accumulator.

In one embodiment, the power tool comprises a measuring device that is designed to measure the parasitic electric current generated, wherein the control device is designed to control the charging of the electrical energy storage device with the parasitic electric current as a function of the measured parasitic electric current.

This results in the technical advantage, for example, that the charging of the electrical energy storage device can be controlled efficiently.

In one embodiment, the measured parasitic electrical current is compared with a predetermined current threshold value, wherein the charging of the electrical energy storage device is controlled as a function of the comparison. The control device is thus in particular designed to control the charging of the electrical energy storage device with the parasitic electrical current as a function of this comparison.

According to one embodiment, if the measured parasitic electrical current is greater than, or greater than or equal to, the predetermined current threshold value, the charging of the electrical energy storage device with the parasitic electrical current is stopped and/or interrupted. This means in particular that the control device is designed to interrupt and/or stop the charging of the electrical energy storage device with the parasitic electrical current when the measured parasitic electrical current is greater than, or greater than or equal to, the predetermined current threshold value. According to one embodiment, regulation is provided. The regulation comprises regulation of a motor duty cycle based on an electrical voltage of the electrical energy storage device, in particular of the battery voltage if the electrical energy storage device includes a battery and/or is a battery. According to one embodiment, the control device is designed to carry out the regulation, i.e. in particular to regulate a motor duty cycle based on an electrical voltage of the electrical energy storage device.

This results in the technical advantage, for example, that due to an excessively high parasitic electrical current, the electrical energy storage device can be damaged by the corresponding charging.

In one embodiment, an intermediate circuit is connected between the electrical energy storage device and the electric motor, wherein the intermediate circuit is not configured for the generated parasitic electrical current.

This results in the technical advantage, for example, that the intermediate circuit can be constructed in a simple manner. This results in the technical advantage, for example, that this circuit can be produced easily and at low cost. Furthermore, this results in the technical advantage, for example, that an installation space for the intermediate circuit can be kept compact. Furthermore, this results in the technical advantage, for example, that a cooling system for the intermediate circuit can be omitted. This means in particular that a specification of the intermediate circuit specifies that it is not configured for the generated parasitic electrical current. However, according to the design described here, this is not harmful insofar as the parasitic electric current generated is dissipated into the electric energy storage device, so that damage to the intermediate circuit due to the parasitic electric current can be efficiently avoided.

In one embodiment, the power tool does not have a brake chopper.

This results in the technical advantage, for example, that the power tool can be constructed compactly and easily. Furthermore, this results in the technical advantage, for example, that a cooling system for a brake chopper can be omitted.

In one embodiment, the braking process comprises short-circuit braking and/or recuperative braking.

This results in the technical advantage, for example, that the electric motor can be braked efficiently.

In one embodiment, the braking process comprises the short-circuit braking as the last braking prior to reaching a standstill of the electric motor.

This results in the technical advantage, for example, that the electric motor standstill can be achieved efficiently and reliably. In particular, a complicated motor standstill detection system can thereby be advantageously omitted. This has the further technical advantage, for example, that the electric motor can be efficiently prevented from rotating in an opposite direction, i.e. starting up again, after the electric motor has come to a standstill due to the countercurrent braking.

In one embodiment, the power tool comprises a rotational speed detection device which is designed to detect a rotational speed of the electric motor, wherein the control device is designed to control the braking process as a function of the detected rotational speed.

This results in the technical advantage, for example, that the braking process can be controlled efficiently.

In one embodiment, the detected rotational speed is compared with a predetermined rotational speed threshold value. In one embodiment, the control device is designed to control the braking process as a function of this comparison. For example, according to one embodiment, the control device is designed to control the braking process in such a way that short-circuit braking is carried out when the detected rotational speed is less than, or less than or equal to, the predetermined rotational speed threshold value.

In one embodiment, a plurality of different rotational speed threshold values are provided. The above statements in connection with a rotational speed threshold value apply analogously for a plurality of speed threshold values. This means in particular that the braking process is controlled according to the predetermined rotational speed threshold value and as a function of the detected rotational speed. This means in particular that, as a function of the current rotational speed of the electric motor, for example short-circuit braking and/or recuperative braking and/or countercurrent braking is carried out.

According to one embodiment, the power tool in the method according to the second aspect is the power tool according to the first aspect.

In one embodiment, the power tool according to the first aspect is designed or configured to execute or carry out the method according to the second aspect.

According to one embodiment, the method according to the second aspect is executed or carried out by the power tool according to the first aspect.

Technical functionalities of the method result analogously from corresponding technical functionalities of the power tool, and vice versa. This means in particular that device features result from corresponding method features and vice versa.

In one embodiment, a parasitic electrical current generated due to the countercurrent braking is discharged into the electrical energy storage device in order to charge the electrical energy storage device with the parasitic electrical current. In one embodiment, the electrical energy storage device is charged with the parasitic electrical current.

In one embodiment, the generated parasitic electrical current is measured, wherein the charging of the electrical energy storage device with the parasitic electrical current is controlled as a function of the measured parasitic electrical current.

In one embodiment, a rotational speed of the electric motor is detected, the braking process being controlled as a function of the detected rotational speed.

In one embodiment, the method according to the second aspect is a computer-implemented method.

When the term "motor" is used in the description, this is to be understood as meaning "electric motor." When the term "battery" and/or "accumulator" is used in the description, this is to be understood as meaning the more general term "electrical energy storage device."

BRIEF DESCRIPTION OF THE DRAWINGS

Exemplary embodiments of the disclosure are illustrated in the drawings and explained in more detail in the following description. In the drawings:

FIG. 1 shows a power tool 101.

DETAILED DESCRIPTION

Figure 1:
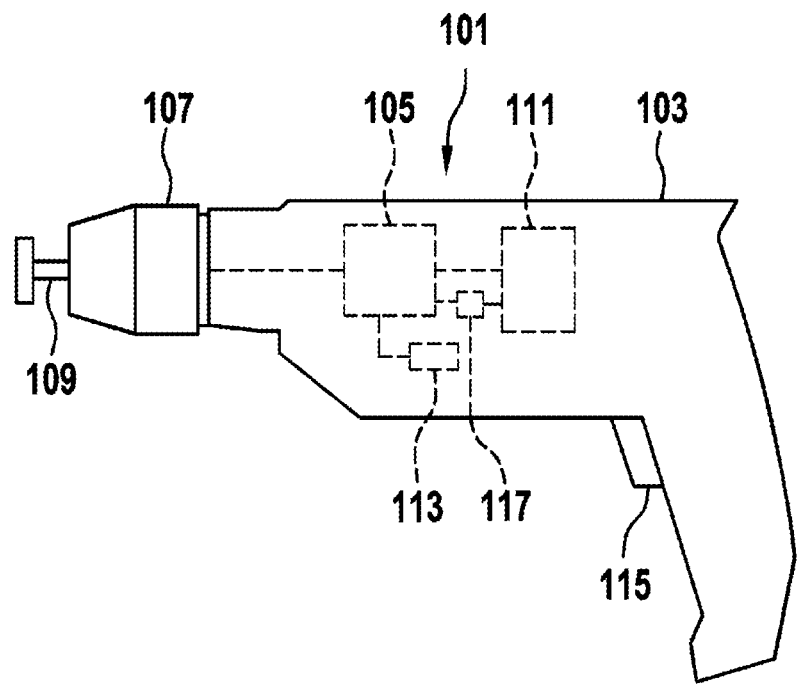
FIG. 1 shows a power tool.

The power tool 101 comprises a housing 103 in which an electric motor 105 is located. The power tool 101 further comprises a tool holder 107 in which an insert tool 109 is located. The tool holder 107 can be rotationally driven by the electric motor 105. This means that the electric motor 105 can rotationally drive the tool holder 107.

The power tool 101 further comprises a control device 111 which is located within the housing 103. The control device 111 is designed to control a braking process of the electric motor 105 in response to a braking request in order to stop the rotating insert tool 109, wherein the braking process comprises countercurrent braking.

According to one embodiment, a braking request is generated in response to reaching a predetermined screwing torque.

The power tool 101 further comprises an electrical energy storage device 113 which can be electrically connected to the electric motor 105 in order to supply the electric motor with electrical energy, wherein a parasitic electrical current generated due to the countercurrent braking can be discharged into the electrical energy storage device 113 in order to charge the electrical energy storage device 113 with the parasitic electrical current.

The power tool 101 further comprises a switch 115 located on the housing 103. A user of the power tool 101 can request starting of the electric motor 105 via the switch 115, for example.

The power tool 101 further comprises a measuring device 117 which is located within the housing 103. The measuring device 117 is designed to measure the generated parasitic electrical current, wherein the control device 111 is designed to control the charging of the electrical energy storage device 113 with the parasitic electrical current as a function of the measured parasitic electrical current.

Figure 2:
FIG. 2 shows a flow chart of a method for braking an electric motor of a power tool.

FIG. 2 shows a flow chart of a method for braking an electric motor of a power tool by means of which the insert tool located in a tool holder of the power tool can be rotationally driven. The method comprises a controlling 201 of a braking process of the electric motor in response to a braking request in order to stop the rotating insert tool, wherein the braking process comprises countercurrent braking.

Figure 3:
FIG. 3 shows a machine-readable storage medium.

FIG. 3 shows a machine-readable storage medium 301 on which a computer program 303 is stored. The computer program 303 comprises commands which, upon execution of the computer program 303 by a computer, cause this computer to carry out a method for braking an electric motor of a power tool.

Figure 4:
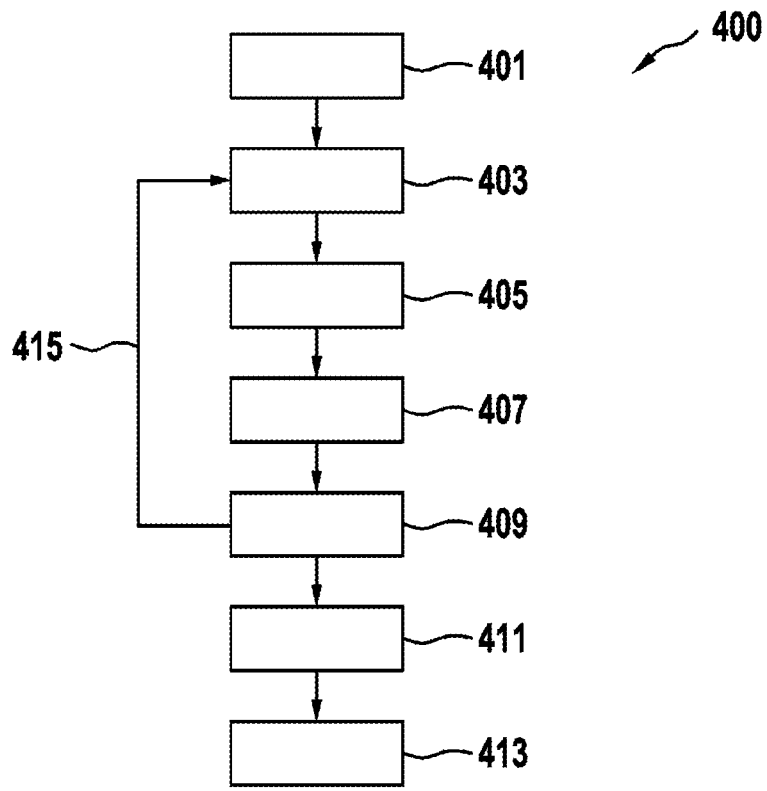
FIG. 4 shows a first block diagram.

FIG. 4 shows a first block diagram 400 which symbolically shows elements of a power tool according to one embodiment.

The power tool comprises an electrical energy storage device 401, in particular a lithium-ion accumulator. The power tool further comprises a control device 403, which comprises a motor controller comprising a power electronics unit. The electrical energy storage device 401 is electrically connected to the control device 403. The power tool further comprises an electric motor 405 which can be controlled by the control device 403.

The electric motor 405 is connected via a transmission 407 to an overrunning clutch with a counter-pressure spring and light barrier 409. The overrunning clutch 409 is connected to an output with a hex receiver and a bit 411. The hex receiver is an example of a tool holder. The bit 411 is an example of an insert tool.

A workpiece 413 can be screwed by means of a screw (not shown), wherein the screw is screwed using the power tool.

When a predetermined screwing torque is reached, the light barrier transmits a signal 415 to the control device which, in response to the signal, controls a braking process of the electric motor 405 in order to stop the bit 411.

Figure 5:
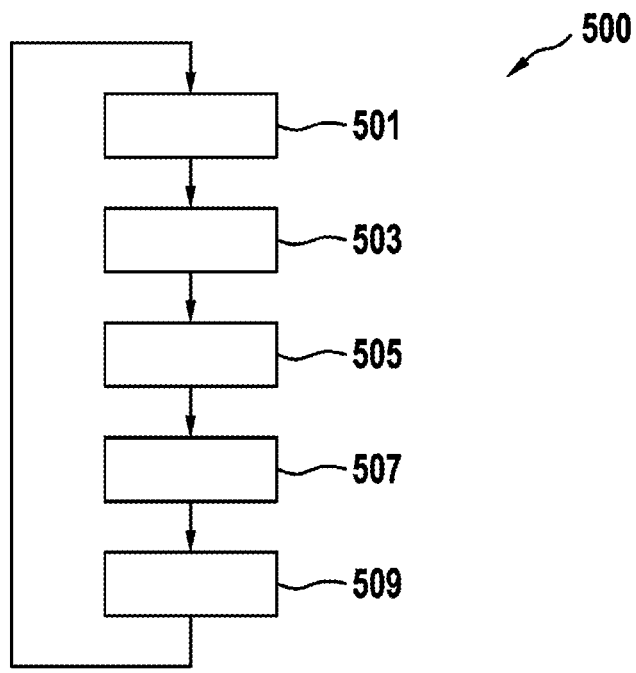
FIG. 5 shows a second block diagram.

FIG. 5 shows a second block diagram 500, schematically showing individual steps of a use of the power tool according to one embodiment.

According to a step 501, the screw is placed onto the workpiece to be screwed and a bit is placed into the hex receiver and a switch of the power tool is actuated in order to request starting of the electric motor. According to a step 503, the electric motor is driven in response to the switch actuation. When a tightening torque (screw torque) of the screw is reached, according to a step 505, a light barrier is activated, which causes the motor to stop and/or halt by braking the motor, the braking comprising countercurrent braking 507. According to a step 509, waiting takes place until the switch is released and actuated again.

Figure 6:
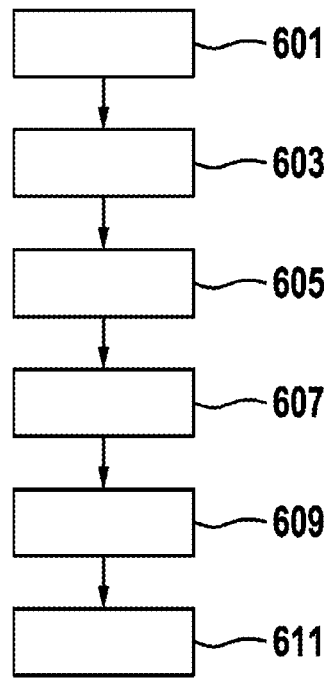
FIG. 6 shows a flow chart of a braking method and
FIG. 7 shows a flow chart of a further braking method.

FIG. 6 shows a flow chart of a braking process according to one embodiment, as may be used for example in a method according to the second aspect.

A braking process may comprise one or more of the following braking processes: Countercurrent braking (CB), recuperative braking (RB), parasitic recuperative braking (PRB), and short-circuit braking (SB). The above abbreviations for the individual braking types are used below.

According to one embodiment, targeted phase shifting of the commutation times can be used for continuous adjustment between (parasitic) recuperation components and countercurrent braking components. According to one embodiment, the current flow is thus diverted and/or controlled via a targeted phase shifting of the commutation times.

The braking process starts in block 601. In a first braking phase 603, for example, 100% CB and 0% PRB are provided. In a subsequent braking phase 605, for example, 50%

CB and, for example, 50% PRB is provided. In a subsequent braking phase 607, for example, 0% CB and, for example, 100% PRB is provided. In a subsequent braking phase 609, for example, 100% SB is provided until the electric motor comes to a standstill according to block 611.

In an embodiment which is not shown, the abbreviation PRB is replaced by RB in the above braking phases 603, 605, 607. This means that, instead of the parasitic recuperation, a recuperation without parasitic electrical current is provided for the purpose of braking.

It should also be noted at this point that the above percentages for the individual brake components are provided as examples. In particular, other values are possible.

In one embodiment, in the braking phase 603, in particular 95% CB and in particular 5% PRB and/or RB is provided instead of 100% CB.

According to one embodiment, complete short-circuit braking, i.e. 100% SB, is provided as the last braking phase before the electric motor comes to a standstill, as shown in accordance with the braking phase 609.

Figure 7:
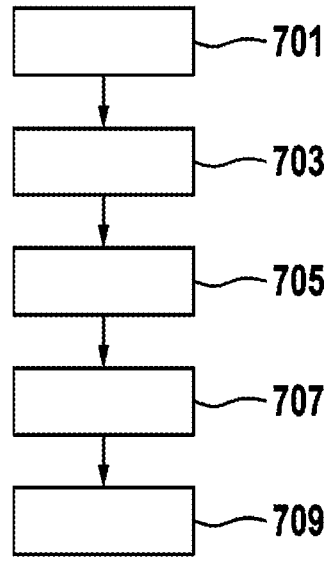

FIG. 7 shows a flow chart of a further braking process according to one embodiment, as can be used for example in a method according to the second aspect.

The braking process starts at block 701. In a first braking phase 703, 100% RB is provided and 0% SB is provided. In a subsequent braking phase 705, 50% RB is provided and 50% SB is provided. In a subsequent braking phase 707, 0% RB is provided and 100% SB is provided. The short-circuit braking is performed according to phase 707 until the motor has come to a standstill according to block 709.

In the above braking phases 703, 705, 707, in an embodiment which is not shown, countercurrent braking (CB) can be provided instead of the recuperative braking (RB).

Furthermore, it is noted that here, too, the above percentages are only exemplary percentages, and other values differing therefrom are also possible.

In one embodiment, in a drive mode of the power tool, the stator field pulls the rotor field and thus the rotor in the drive direction (normal operation). When a screw is tightened, the counter-torque (counter to the drive torque) increases until the overrunning clutch (see also FIG. 4), and the previously set pre-tensioning of the spring, overruns (ball engages over bumps of the ring gear). At the plate where the ball is guided and where the spring is located on the opposite side, engages over the bumps on the ring gear and activates the light barrier. The countercurrent braking is initiated in the motor controller. During commutation (switching of the energized motor phases), the energized motor phase is open for a short time. Due to the inductance of the motor winding, parasitic electrical return currents now flow back from the motor into the electronics. These are now buffered into the battery pack and/or are charged briefly into the battery.

In the prior art, this will be "burned up" by a brake chopper. This requires additional installation space and heat dissipation.

In the prior art, the intermediate circuit (capacitor) is greatly increased for this purpose. This leads to an increase in installation space.

In one embodiment, the battery pack (in general, the electrical energy storage device) can only be charged for positive ° C. (>0° C., i.e., for a temperature of the electrical energy storage device greater than or equal to 0° C.). In one embodiment, this only allows the battery pack to be discharged. For <0° C. battery temperature (i.e., a temperature of the electrical energy storage device of less than or equal to 0° C.), according to one embodiment short-circuit braking is applied until the required battery temperature is reached (battery discharge heats battery cell). Since it may be the case here that the required repeatability cannot be maintained, the control device signals an error, for example that the screw connection is not adequate.

Furthermore, in addition to the motor speed and the motor current (in the case of countercurrent braking), the battery current and the battery voltage can also be regulated in order to operate these within the battery specifications.

Relationships:
The higher the braking current, the higher the (parasitic) return current into the battery
The higher the motor speed to be braked, the higher the braking current
The braking current can be adjusted via the duty cycle of the PWM at the motor phase In addition to the block commutation, sinusoidal commutation can be applied. In addition to a DC and an EC, an AC Motor can also be operated.

Battery packs with lithium cells are currently used. Any other rechargeable battery cells can be used.

The following is another example application:
Maximum braking effect (e.g. motor braking from max. speed range):
 100% countercurrent braking
 0% (parasitic) recuperation
50% countercurrent braking effect (e.g. motor braking from medium speed range):
 50% countercurrent braking
 50% (parasitic) recuperation
0% countercurrent braking effect (e.g. motor braking from medium speed range):
 0% countercurrent braking
 100% (parasitic) recuperation It should be noted that motor standstill down to 0 rpm is usually only possible with short-circuit braking. In this case, braking is carried out from a very low motor speed to 0 rpm. For example:
1. Active braking process with countercurrent braking and (parasitic) recuperation/charging process.
2. Passive braking process with short-circuit braking With regard to a maximum braking effect, the braking process according to FIG. 6 is preferably used. At the end, according to one embodiment, the short-circuit braking is applied. This is particularly advantageous if the μC (microcontroller as an example of a control device) used cannot provide enough computing power (for cost reasons) to implement robust standstill detection with countercurrent braking. Therefore, at a very low rotational speed, a switch is made to 100% SB in order to avoid restarting in the opposite direction. Therefore, for this exemplary embodiment the sequence is as follows.
1. Signal for activating the braking process
2. ~95% CB and 5% PRB (if 100% CB is technically not possible)
3. 100% SB
4. Standstill of the motor.

The invention claimed is:
1. A power tool, comprising:
a housing;
an electric motor located in the housing, wherein the electric motor is configured to rotationally drive an insert tool located in a tool holder of the power tool;
an electrical energy storage device configured to be electrically connected to the electric motor in order to supply the electric motor with electrical energy;
a measuring device configured to measure a generated parasitic electrical current; and a control device configured to control a braking process of the electric motor in response to a braking request in order to stop the rotating insert tool, wherein the braking process comprises countercurrent braking, wherein the parasitic electrical current is generated due to the countercurrent braking and is discharged into the electrical energy storage device in order to charge the electrical energy storage device with the parasitic electrical current, and wherein the control device is further configured to control the charging of the electrical energy storage device with the parasitic electrical current as a function of the measured parasitic electrical current.

2. The power tool according to claim 1, further comprising:

an intermediate circuit connected between the electrical energy storage device and the electric motor, wherein the intermediate circuit is not configured for the generated parasitic electrical current.

3. The power tool according to claim 1, wherein the power tool does not have a brake chopper.

4. The power tool according to claim 1, wherein the braking process comprises short-circuit braking and/or recuperative braking.

5. The power tool according to claim 4, wherein the braking process comprises the short-circuit braking as the last braking prior to reaching an electric motor standstill.

6. The power tool according to claim 1, further comprising:

a rotational speed detection device configured to detect a rotational speed of the electric motor, wherein the control device is further configured to control the braking process as a function of the detected rotational speed.

7. A method for braking an electric motor of a power tool, with the electric motor being configured to rotationally drive an insert tool located in a tool holder of the power tool, the method comprising:

supplying the electric motor with electrical energy from an electrical energy storage device that is electrically connected to the electric motor;

measuring a generated parasitic electrical current using a measuring device of the power tool;

in response to a braking request, controlling a braking process of the electric motor in order to stop the rotating insert tool using a control device of the power tool, wherein the braking process comprises countercurrent braking, wherein the parasitic electrical current is generated due to the countercurrent braking and is discharged into the electrical energy storage device in order to charge the electrical energy storage device with the parasitic electrical current, and wherein the control device is further configured to control the charging of the electrical energy storage device with the parasitic electrical current as a function of the measured parasitic electrical current.

8. A computer program comprising instructions which, when the computer program is executed by a computer, cause the computer to carry out a method according to claim 7.

9. A non-transitory machine-readable storage medium on which the computer program according to claim 8 is stored.

10. The power tool according to claim 1, wherein the power tool is an electric screwdriver.

11. The power tool according to claim 1, wherein the electrical energy storage device is a lithium-ion accumulator.

* * * * *